United States Patent [19]
Schrenk et al.

[11] Patent Number: 5,094,788
[45] Date of Patent: Mar. 10, 1992

[54] INTERFACIAL SURFACE GENERATOR

[75] Inventors: Walter J. Schrenk; Ranganath K. Shastri; Ralph F. Ayres, all of Midland; Daniel J. Gosen, Saginaw, all of Mich.

[73] Assignee: The Dow Chemical Company, Midland, Mich.

[21] Appl. No.: 633,644

[22] Filed: Dec. 21, 1990

[51] Int. Cl.⁵ .......................................... B29C 47/06
[52] U.S. Cl. ................................. 264/171; 264/40.7; 264/173; 366/340; 425/131.1; 425/133.5; 425/462
[58] Field of Search ............... 264/171, 173, 514, 515, 264/40.7; 425/131.1, 133.1, 133.5, 462, 463, 207, 206, 209, 464

[56] References Cited
U.S. PATENT DOCUMENTS

| 3,195,865 | 7/1965 | Harder | 366/340 |
| 3,239,197 | 3/1966 | Tollar | 366/340 |
| 3,555,128 | 1/1971 | Schrenk | 265/171 |
| 3,557,265 | 1/1971 | Chisholm et al. | 264/171 |
| 3,759,647 | 9/1973 | Schrenk et al. | 425/133.1 |
| 4,094,947 | 6/1978 | Alfrey et al. | 264/171 |
| 4,152,387 | 5/1979 | Cloeren | 264/171 |
| 4,426,344 | 1/1984 | Dinter et al. | 264/171 |
| 4,435,141 | 3/1984 | Weisner et al. | 264/171 |

FOREIGN PATENT DOCUMENTS

3229554  3/1984  Fed. Rep. of Germany ...... 264/171

Primary Examiner—Jeffery Thurlow

[57] ABSTRACT

Method and apparatus are disclosed for making multi-layer film having a prescribed gradient in, or distribution of, the thicknesses of one or more materials through the thickness of the film.

24 Claims, 8 Drawing Sheets

INTERFACIAL SURFACE GENERATOR

FIELD OF THE INVENTION

This invention relates to interfacial surface generators and to methods of generating interfacial surfaces in a fluid mass.

BRIEF DESCRIPTION OF THE PRIOR ART

A number of multilayer film structures have been devised wherein an ordered arrangement of layers of various materials in particular layer thicknesses is desired. Exemplary of these structures are those which produce an optical or visual effect because of the interaction of contiguous layers of materials having different refractive indices and layer thicknesses. In films such as those described in U.S. Pat. No. 3,711,176 to Schrenk et al., it is further desirable that a gradient or other distribution in the thicknesses of layers of one or more materials be established through the thickness of the film.

Multilayer films have previously been made or suggested to be made by the use of complex coextrusion feedblocks alone, see, e.g., U.S. Pat. No. 3,773,882 and 3,884,606 to Schrenk, and the suggestion has been made to modify such a device to permit individual layer thickness control, see U.S. Pat. No. 3,687,589 to Schrenk. Such modified feedblocks could be used to make a multilayer film with the desired layer thickness gradient or distribution of layer thicknesses from one major surface of the film to an opposing surface. These devices are very difficult and costly to manufacture, however, and are limited in practical terms to making films of no more than about three hundred total layers. Moreover, these devices are complex to operate and not easily changed over from the manufacture of one film construction to another.

Multilayer films have also been made or suggested to be made by a combination of a feedblock and one or more interfacial surface generators in series, for example as described in U.S. Pat. No. 3,565,985 to Schrenk et al. Such a combination would generally be preferred for producing a film of a given number of layers over the use of only the modified, multilayer feedblocks discussed previously, because of the greater flexibility or adaptability and lesser manufacturing costs associated with a feedblock/ISG combination.

Previous ISG's have not been designed for the manufacture of multilayer films, however, but for the mixing of highly viscous materials such as melts of various thermoplastics.

These known ISG's have operated generally by forcing the viscous fluids to be mixed through a series of passageways which repeatedly separate and recombine stream elements during the flow of a stream of viscous fluids through the apparatus, with the intent generally of creating interfacial surfaces by repeated divisions of layers or aggregations generally of a given material.

Distortions and disruptions of the layers in a given stream of materials result from these divisions and recombinations, so that a second stream of materials exiting even one ISG may depart significantly from the desired character and/or configuration of the layers in a coextruded first composite stream from a feedblock. These distortions, moreover, are multiplied where several ISG's are used in series.

Additionally, conventional ISG's which divide an incoming layered stream of materials into several layered branch streams, and which then rearrange and stack the branch streams simply perpetuate with the aforementioned distortions the original configuration of the layers in the first composite stream, rather than extending this configuration throughout the thickness of the second composite stream or the multilayer film prepared therefrom. For example, a monotonic distribution of the thicknesses of layers of a material A within a first composite stream would be repeated as a sawtooth-like pattern in a film prepared by a combination of a feedblock and a conventional ISG.

SUMMARY OF THE INVENTION

The present invention solves these problems by offering in a first embodiment a novel method and apparatus for making multilayer films having a prescribed layer thickness gradient in, or other distribution of, the thicknesses of layers of one or more materials from one major surface of the film to an opposing surface.

In this first embodiment, a first stream comprising discrete, overlapping layers of the one or more materials is divided into a plurality of branch streams, these branch streams are redirected or repositioned and individually symmetrically expanded and contracted, the resistance to flow through the apparatus and thus the flow rates of each of the branch streams are independently adjusted, and the branch streams recombined in overlapping relationship to form a second stream having a greater number of discrete, overlapping layers of the one or more materials distributed in the prescribed gradient or other distribution.

In a second, alternate embodiment, the branch streams are created, repositioned, independently adjusted to a desired flow rate and recombined, and the second stream is symmetrically expanded and contracted.

DETAILED DESCRIPTION OF THE DEPICTED EMBODIMENTS

As suggested in the summary description above of the drawings, an apparatus or element of the present invention in a first embodiment comprises three functionally distinct but not necessarily physically separable sub-elements. The first sub-element performs the functions of dividing a first composite stream into branch streams and redirecting or repositioning the branch streams so created. The second sub-element expands the branch streams, and the third sub-element performs the functions of contracting the branch streams, independently adjusting their flow rates and recombining them into an integrated whole.

While these steps may be discretely and sequentially performed, it will be understood that steps may be combined or overlap if desired. Thus, the independent adjustment of the flow rates of the individual branch streams through an apparatus may be accomplished by individually, controllably contracting the branch streams to selected degrees. Similarly, the expanding and contracting steps may coincide or overlap.

Figure 1:
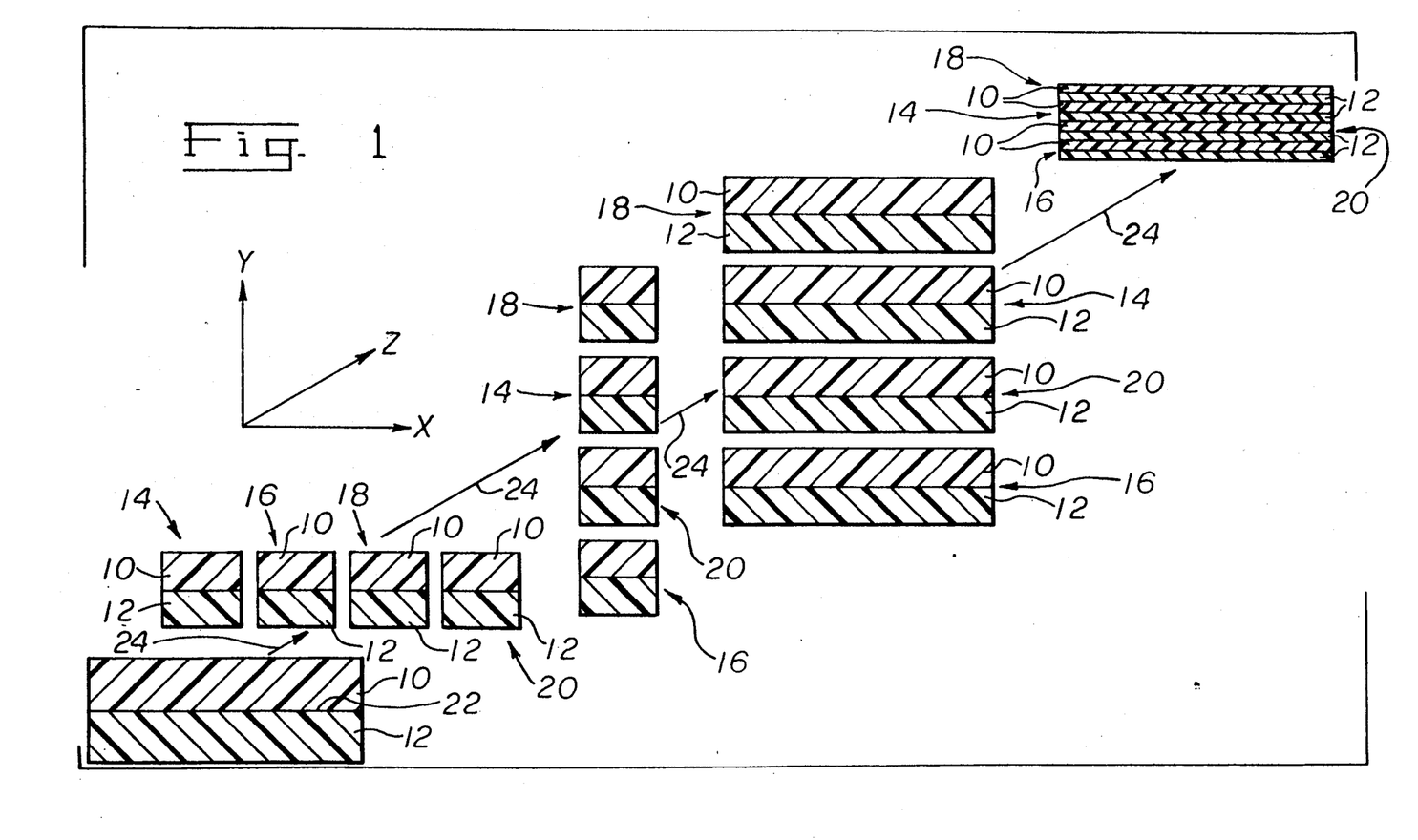
FIG. 1 is a schematic illustration of the practice of a method of the present invention for forming a multilayer stream from a first composite stream comprising two discrete and substantially continuous layers of diverse thermoplastic materials.

The performance of the dividing, repositioning, expanding, contracting, adjusting and recombining steps by these three sub-elements will typically and preferably be as shown schematically in FIG. 1. As may be seen by reference to that drawing, a layered first composite stream of two discrete and continuous layers 10 and 12 of diverse thermoplastic materials, such as might proceed from a conventional coextrusion feedblock, enters the ISG and is divided into four branch streams 14, 16, 18 and 20 within the first sub-element. Generally the materials in one or both of the layers 10 and 12 will be such that they will be desirably distributed in a gradient or other distribution throughout a second composite stream.

It is to be understood also that "a conventional coextrusion feedblock" as used in the preceding paragraph embraces a multilayer feedblock of the type disclosed in U.S. Pat. No. 3,773,882 to Schrenk. The first composite stream can thus comprise a number of layers and materials substantially exceeding the two layers shown in FIG. 1. By the same token, it is to be understood that the first composite stream can manifest the desired gradient or distribution in layer thicknesses, or can possess a different distribution or be comprised of layers of equal thickness as illustrated in FIG. 1. The illustrated first composite stream has been selected, however, in the interest of simplifying as much as possible the explanation and description of the present invention.

The layered first composite stream in FIG. 1 defines a planar layer interface 22 between the layers 10 and 12 which lies generally in the x-z plane of an x-y-z coordinate system, wherein the z-direction is taken as corresponding to the direction of fluid flow generally through the apparatus (shown by the arrows 24 in FIG. 1), the x-direction defines a transverse dimension of the interface 22 and layers 10 and 12, and the y-direction is in the thickness direction of the layers 10 and 12 and extends generally perpendicularly away from the planar layer interface 22.

The division of the first composite stream is generally along the x-axis, so that the planar layer interface 22 is divided up generally among two or more of the branch streams 14, 16, 18, and 20, depending on the extent of the layers 10 and 12 and thus of the layer interface 22 in the x-direction. Where the layers 10 and 12 and the layer interface 22 therebetween span the first composite stream in the x-direction as shown in FIG. 1, for example, the interface 22 is divided among each of the branch streams 14, 16, 18 and 20.

At least those branch streams into which the interface 22 was divided, and preferably all of the branch streams 14, 16, 18 and 20 are then redirected and repositioned with respect to both the x- and y-axes and with respect to one another in flowing through the conduits of the first sub-element, so that at the exit of the first sub-element the streams 14, 16, 18 and 20 are preferably stacked along the y-axis. Or, expressed differently, the branch streams 14, 16, 18, and 20 are in flowing through the first sub-element divergently displaced along the "y" axis from their original positions while being convergently displaced along the "x" axis.

In the second sub-element, at least the two or more branch streams and preferably all of the stacked branch streams 14, 16, 18 and 20 independently undergo a symmetrical expansion along the x-axis (in the plane of the layer interface 22 of interest) in their transverse (or x) dimension, preferably until the transverse width of a branch stream is substantially as great as the width of the first composite stream entering the apparatus. This expansion is initiated from a central location in the apparatus along the y-axis, and occurs uniformly with respect to each of the layers 10 and 12 in a given branch stream as shown. Preferably the branch streams 14, 16, 18 and 20 also expand uniformly with respect to one another as shown.

At the exit of the second sub-element, the two or more branch streams and preferably all of the branch streams 14, 16, 18 and 20 enter into the third sub-element wherein they each independently undergo a similar progressive, symmetrical contraction or reduction of their thickness along the y-axis or in the y-direction and are recombined to form a layered second composite stream.

The extent to which each branch stream is contracted is preferably controlled so as to restrict the flow of a particular branch stream or streams as these streams are recombined with the other branch streams. Layers 10 and 12 in those branch streams which are contracted to the greatest extent or whose flow is most greatly restricted become proportionately thinner than in other branch streams which are restricted to a lesser extent. In this way, by individually restricting the flow rates of the branch streams, a layer thickness gradient or distribution of layer thicknesses generally can be established for layers 10 and 12 of materials within a second composite stream formed of the recombined branch streams Each of the branch streams 14, 16, 18 and 20 have been equally contracted in FIG. 1, for example, so that successive layers 10 and 12 through the thickness of the second composite stream are equally thick to one another. The contraction of each branch stream occurs evenly along the x-axis (i.e., in the plane of the layer interface 22 of greatest interest) with respect to the layers 10 and 12 in a given branch stream as shown.

An apparatus for performing the steps schematically illustrated in FIG. 1 and described above may be understood by reference to FIGS. 2-15, wherein a first embodiment of the ISG apparatus as a whole is given by the number 26.

Figure 2:
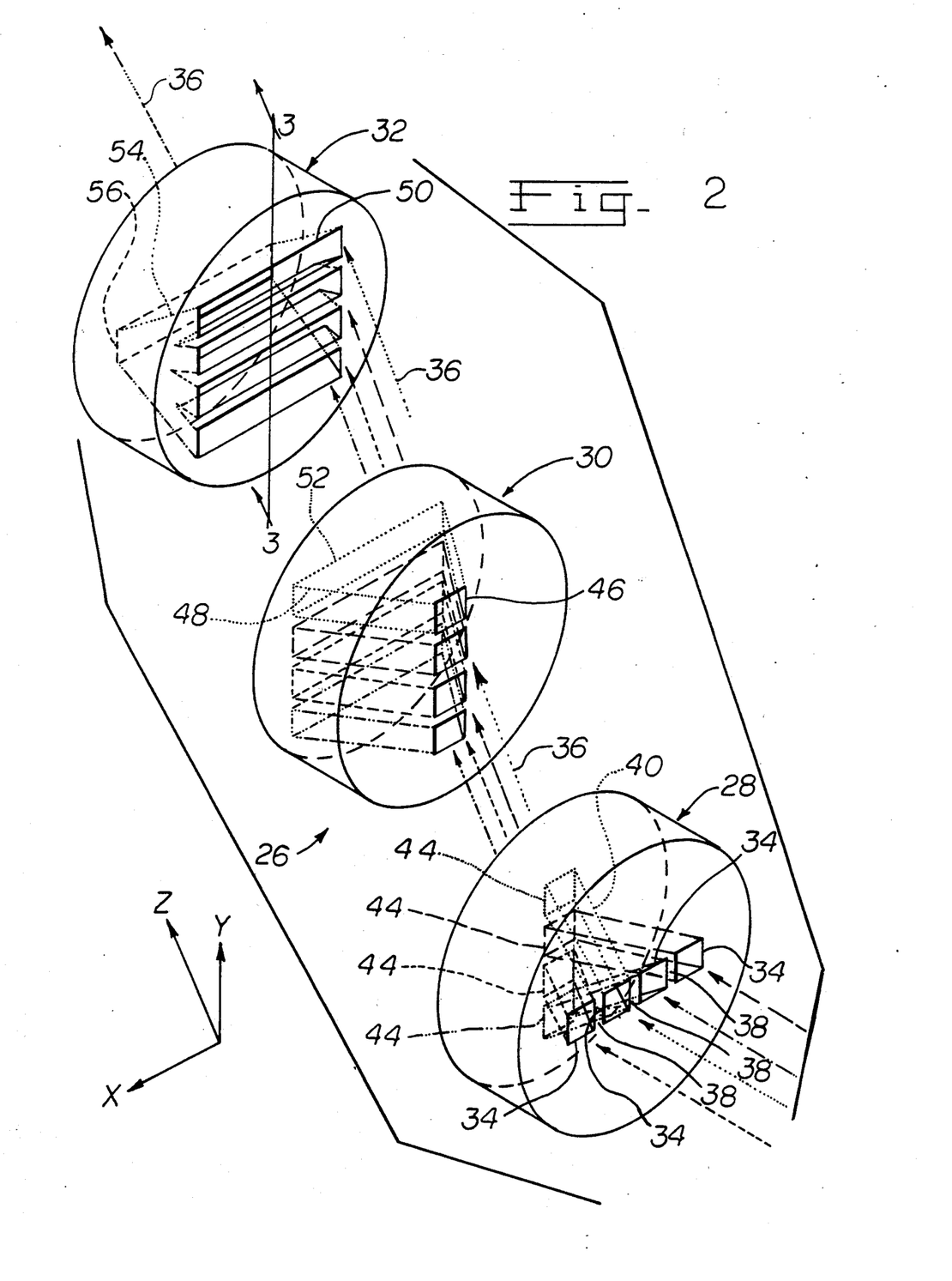
FIG. 2 is an isometric view of a first embodiment of an apparatus of the present invention as a whole

In FIG. 2, the ISG 26 comprises first, second, and third sub-elements 28, 30, and 32. A first composite stream comprised of discrete overlapping layers of diverse polymeric or thermoplastic materials, of which at least one pair defines a generally planar layer interface therebetween lying generally in an x-z plane, enters the ISG 26 through regularly-shaped inlet openings 34 in the first sub-element 28 and flows through the elements 28, 30 and 32 as indicated by the arrows 36.

Referring now to FIGS. 3 through 6, it can be seen that these inlet openings 34 have preferably substantially identical rectangular or square cross-sections and are aligned generally along the x-axis in the previously-defined x-y-z coordinate system. The four inlet openings 34 are defined by three dividing wall portions 38 (FIG. 2) which can serve as dividing means for dividing the first composite stream of FIG. 1 into the four separate branch streams 14, 16, 18, and 20.

The branch streams 14, 16, 18, and 20 in the first sub-element 28 proceed from the inlet openings 34 through first conduits 40 (FIGS. 3-6). These first conduits 40 act as means for redirecting or repositioning each of the streams 14, 16, 18, and 20 with respect to both of the x- and y- axes, the general direction and degree of displacement associated with each conduit 40 being indicated by the arrows 42 in FIGS. 3-6. Preferably these conduits 40 are substantially of the same length.

Figures 3, 4:
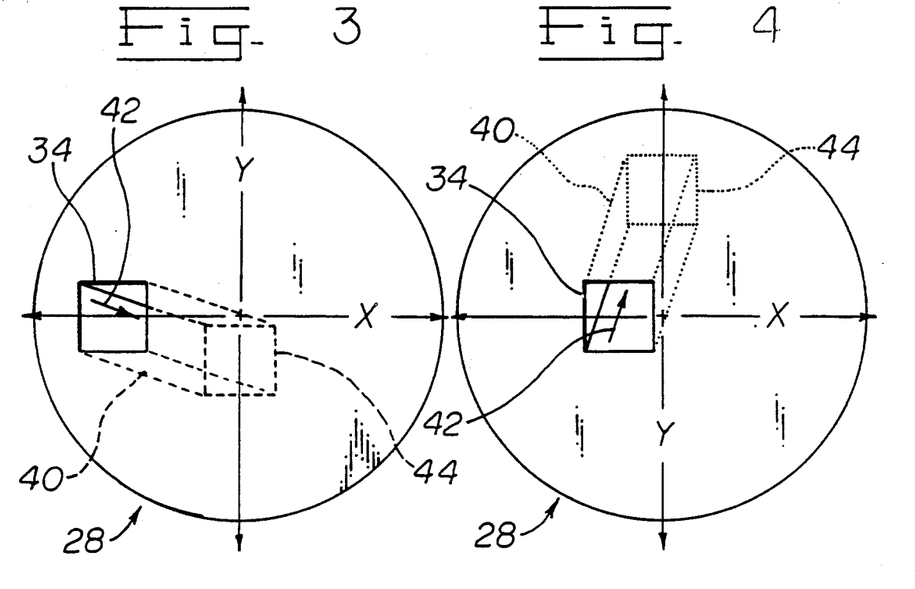
FIG. 3–6 are views in isolation of conduits within a first portion or sub-element of the apparatus of FIG. 2, taken from the front or upstream side of the first sub-element and showing the flow paths of fluids moving through the apparatus and through the conduits.
Figure 5:
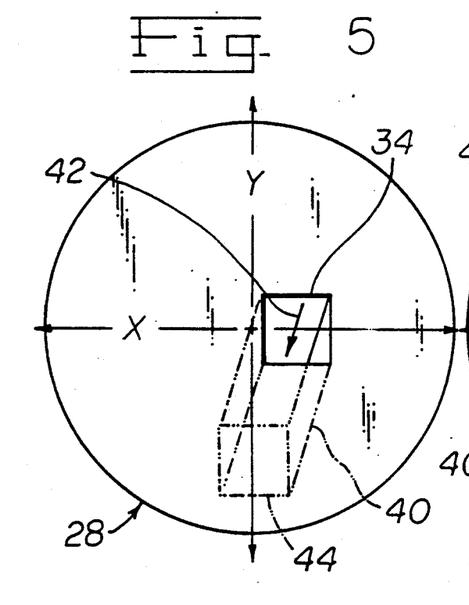
Figure 6:
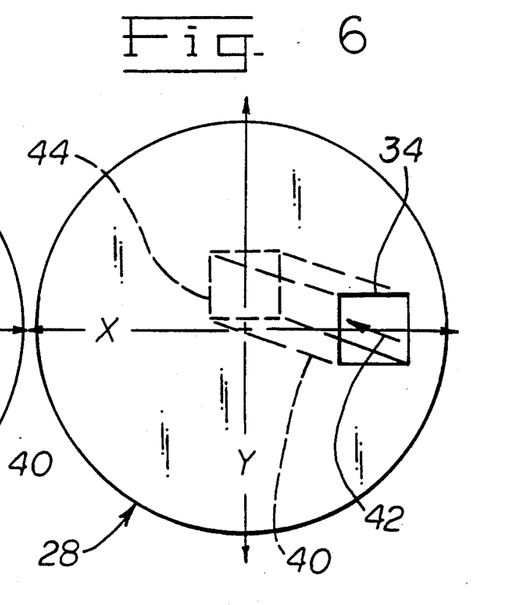
Figure 7:
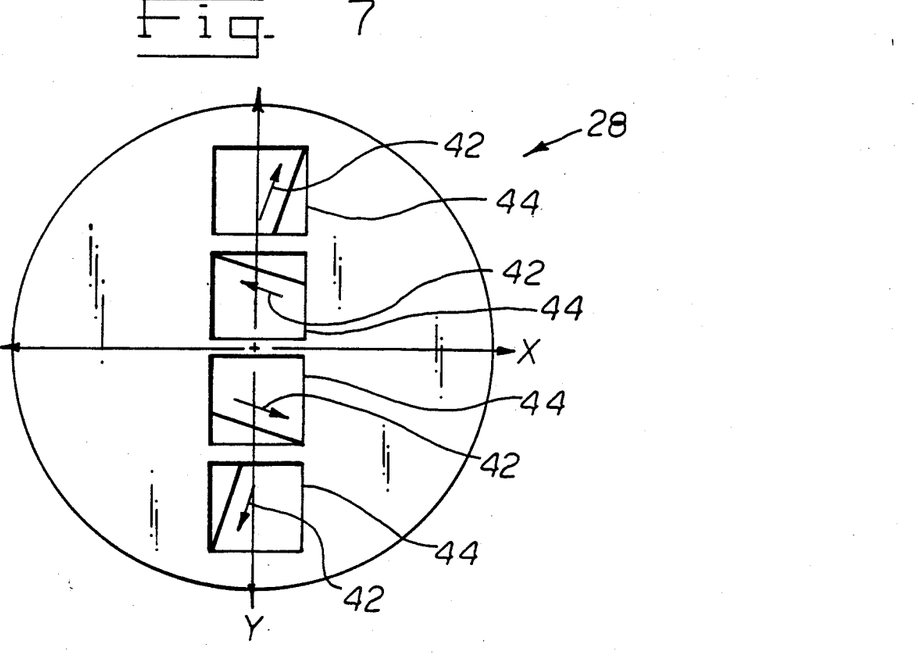
FIG. 7 is a rear or downstream face view of the first sub-element shown in FIGS. 3–6.

The streams 16 and 18 entering through the inner two inlet openings 34 are displaced to the greatest extent along the y-axis and the least along the x-axis (see FIGS. 4 and 5). Similarly, the branch streams 14 and 18 are displaced least along the y-axis, and most along the x-axis (see FIGS. 3 and 6) so that at the exit of the first sub-element 28, the outlet ports 44 associated with the conduits 40 are in a preferred embodiment stacked generally along the y-axis (FIGS. 2,7).

Preferably, the repositioning described above is effected without substantially changing or distorting the cross-sections of the various branch streams, such as by rotating the laminae within a given branch stream with respect to the laminae of another branch stream.

The conduits 40 and outlet ports 44 are preferably also substantially identical in true cross-section to one another and to the square or rectangular inlet openings 34.

Figure 8:
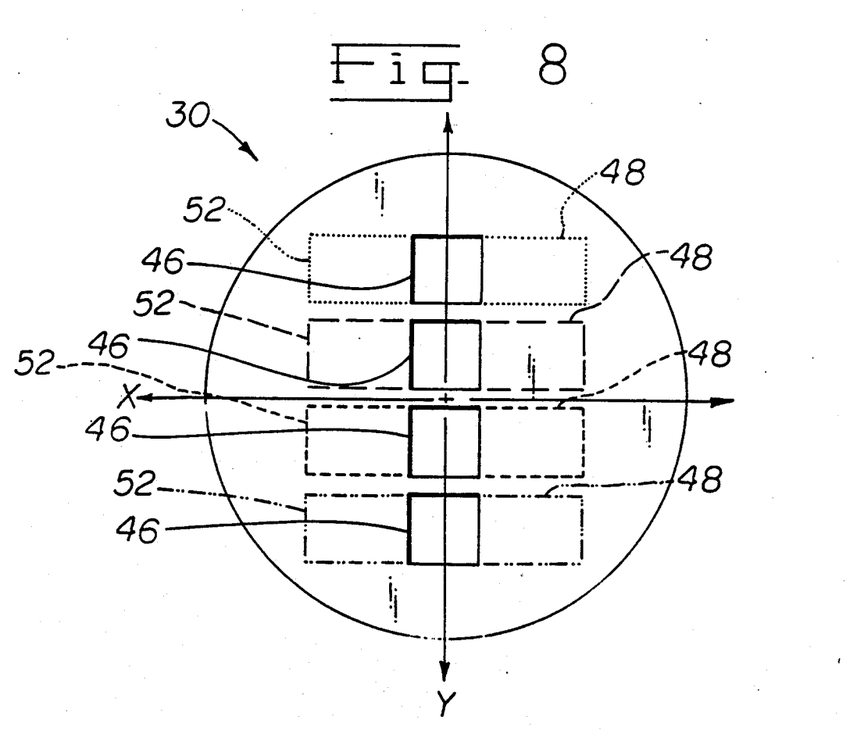
FIG. 8 is a front view of a second portion or sub-element of the apparatus of FIG. 2, showing conduits within the second sub-element corresponding to the conduits in the first sub-element.
Figure 9:
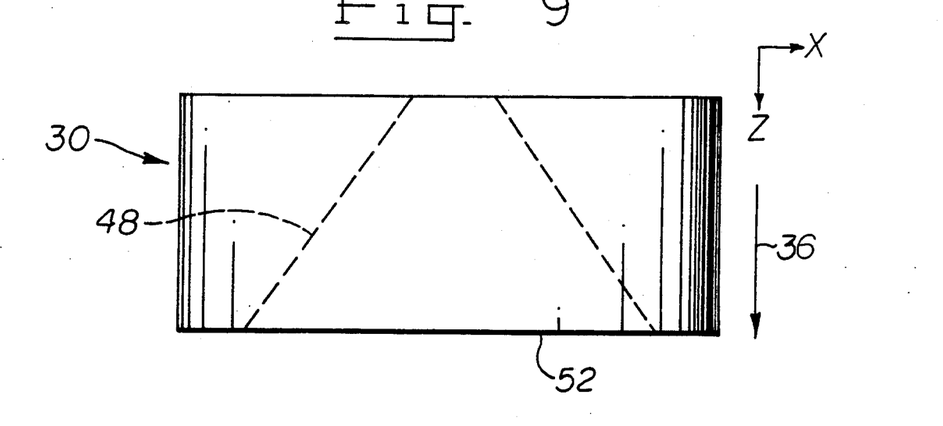
FIG. 9 is a top view of the conduits within the second sub-element of FIG. 8, showing the direction of fluid flow through the conduits and through the second sub-element.
Figures 10, 11:
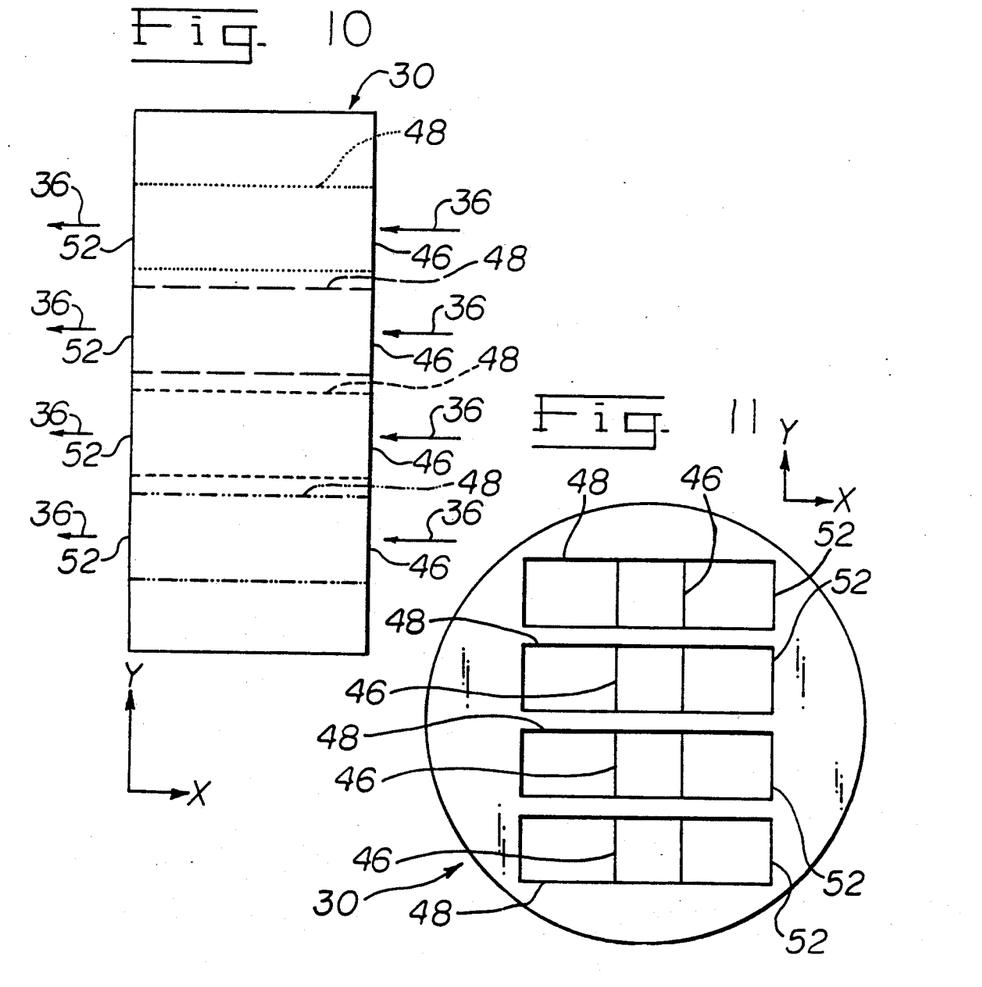
FIG. 10 is a side view of the conduits of the second sub-element, showing again the flow path of fluids through the conduits.
FIG. 11 is a rear view of the second sub-element depicted in FIGS. 8–10.

As may be seen in FIG. 2, and now more particularly in FIG. 8, the outlet ports 44 from the first sub-element 28 communicate with second inlet openings 46 of the second sub-element 30, which second inlet openings 46 are also preferably substantially identically square or rectangular in cross-section to the outlet ports 44 and to one another.

After passing through the outlet ports 44 and second inlet openings 46, the streams 14, 16, 18, and 20 are preferably progressively and symmetrically expanded in their transverse (x) dimension by passage through respective second conduits 48 (see FIGS. 2, 8, 9 and 1).

The second conduits 48 are preferably substantially identically configured to one another in cross-section so as to accomplish a uniform expansion of the branch streams 14, 16, 18 and 20. This common configuration in its preferred form gives the impression of a flattened funnel having a rectangular end portion (FIGS. 8-11), so that the branch streams in passing through the second conduits 48 each possess a gradually progressively greater transverse dimension along the x-axis.

Figure 12:
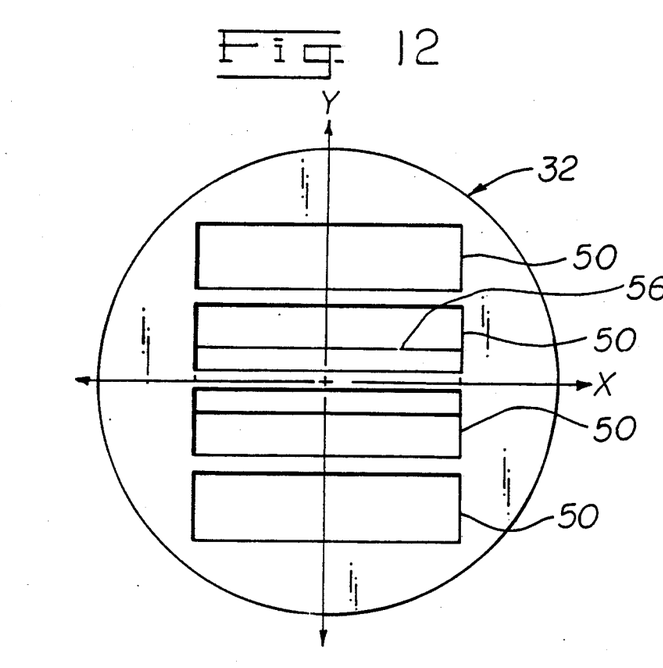
FIG. 12 is a front view of the third sub-element of the apparatus of FIG. 2, showing conduits which correspond at their entrances to the exits of the conduits in the second sub-element, and which converge to a common exit.

Referring now to FIG. 12, the streams 14, 16, 18, and 20 are then communicated to the third inlet openings 50 of the third sub-element 32 via the outlet ports 52 of the second sub-element 30 (see FIG. 2 also), the third inlet openings 50 thus communicating with the downstream ends of the conduits 48 and being preferably substantially identically square or rectangular in true cross-section therewith.

The branch streams 14, 16, 18, and 20 are then conveyed through third conduits 54 (FIGS. 13 and 14) which symmetrically and individually controllably contract the dimensions of the various branch streams in the y- or thickness direction, and recombine the streams in overlapping relationship so that the second composite stream leaving the device 26 possesses more of the layers 10 and 12 than the first composite stream entering the device 26. The individual control over the thicknesses of the branch streams 14, 16, 18 and 20 enables the thicknesses of the collective layers 10 and 12 within a branch stream to be controlled, as explained above.

Where a gradient in the layer thicknesses of repeated layers 10 and 12 is desired in a second composite stream from one major surface to an opposing surface, for example, the branch stream 18 of FIG. 1 is contracted the most, branch stream 14 is contracted secondmost, and the branch stream 20 is contracted to a greater extent than branch stream 16 but to a lesser extent than the branch stream 14. The corresponding layers 10 and 12 will be thinnest in branch stream 18, will be thicker in branch streams 14 and 20, and will be thickest in branch stream 16 on recombination of the streams.

The third conduits 54 are preferably of a basically constant transverse or "x" dimension (FIGS. 12 and 15) and convey or direct the streams passing therethrough toward a common exit 56. This common exit 56, where the apparatus 26 is but one of several such devices in series, will preferably be of substantially the same overall dimensions in the x- and y-directions as the combined inlet openings 34.

Figures 13, 14:
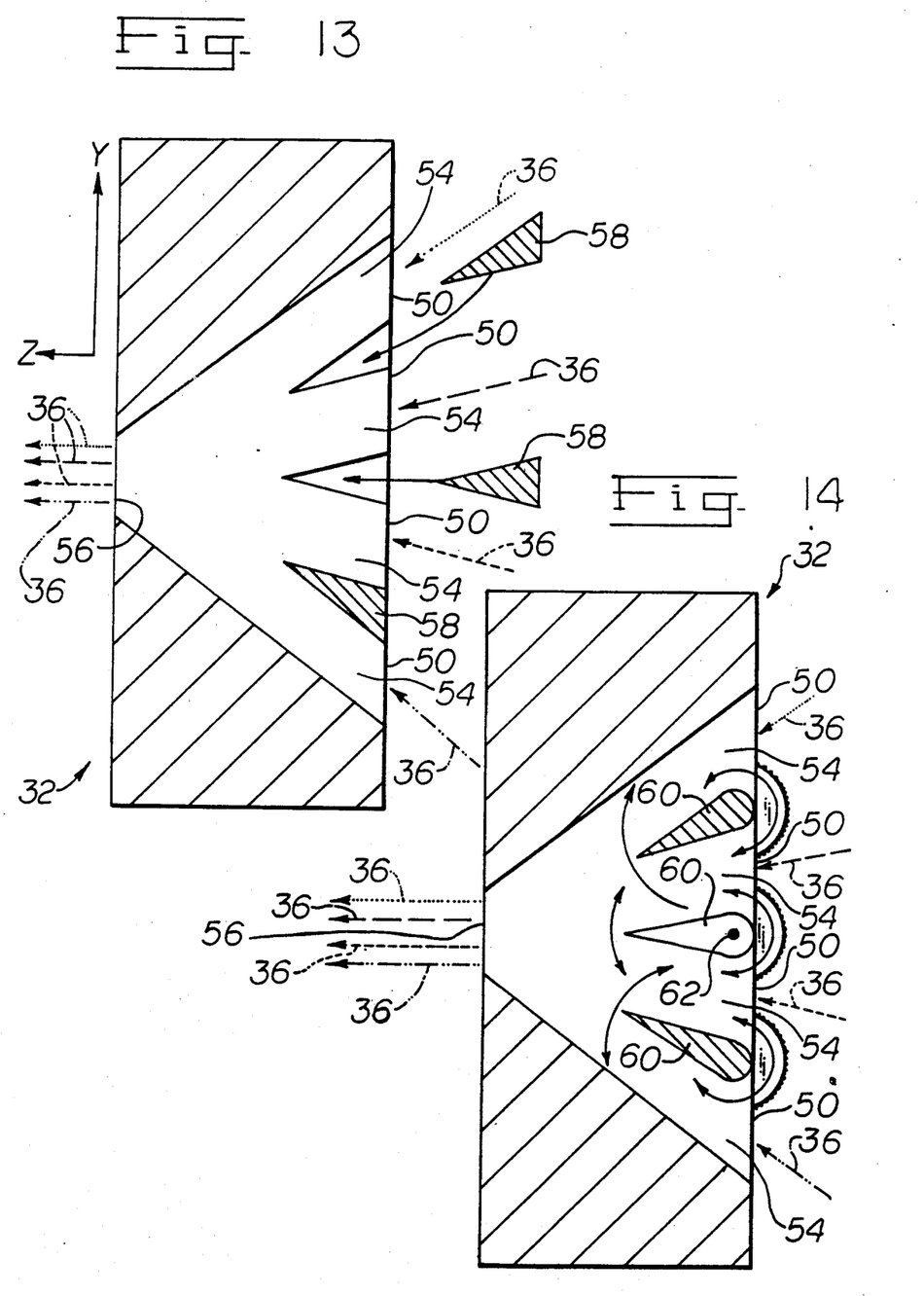
FIG. 13 is a view in cross-section of the convergence of the conduits in a first embodiment of the third sub-element of FIG. 12 toward a common exit, showing by arrows the flow path of fluids through the conduits of the third-sub-element.
FIG. 14 is a view in cross-section of the convergence of the conduits in a second, alternate embodiment toward a common exit, showing by arrows the flow path of fluids through the conduits of the third sub-element.
Figure 15:
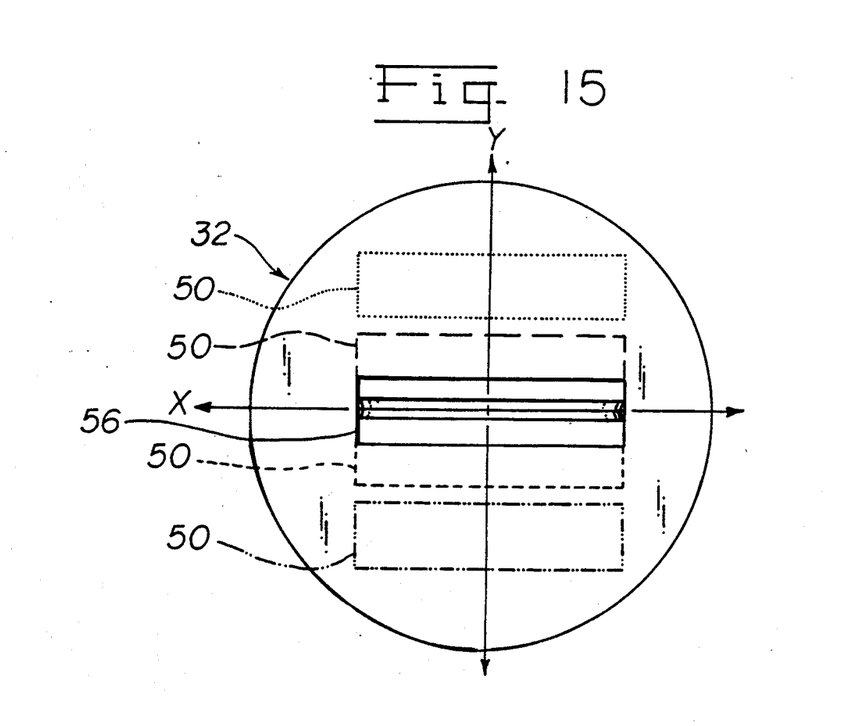
FIG. 15 is a rear or downstream face view of each of the embodiments of the third sub-element shown in FIGS. 12–14.

The independent, controllable contraction of the branch streams in a third sub-element can preferably be accomplished by one of the two devices illustrated in cross-section in FIGS. 13 and 14.

In the embodiment of the third sub-element shown in FIG. 13, the means employed for independently controllably contracting the thickness of the branch streams flowing therethrough comprises replaceable vanes 58 which define sides of the third conduits 54 at a downstream end thereof, just prior to recombination of the branch streams. Where a different layer thickness profile is desired of the layers of a particular material or materials in the second composite stream leaving the ISG 26, the vanes 58 are simply replaced with vanes 58 providing a contraction and restriction of flow in the branch streams which will produce this profile. This replacement is conveniently accomplished by sectioning the apparatus along line 3—3 as shown in FIG. 2, so that this portion of the apparatus may be removed and replaced as a unit.

In an alternate embodiment shown in FIG. 14, vanes 60 are rotatable about pivot pins 62. Rotation of the vanes 60 could be accomplished manually or by automated means. One advantage of the embodiment of FIG. 14 over that shown in FIG. 13 is that the process of coextruding the first composite stream and forming a second composite stream does not have to be stopped with the former embodiment to change vanes 58, and for this reason it is expected that the embodiment of FIG. 14 is to be generally preferred over the embodiment of FIG. 13.

It is to be understood that still other means of controllably restricting the flow of the various branch streams could be employed in the present invention, for example, by the interposition and use of valves, dams, spacers or restrictor bars in any of the conduits corresponding to a selected branch stream, provided of course that these devices do not cause a destructive intermixing of the layers within the branch stream.

Figures 16, 17:
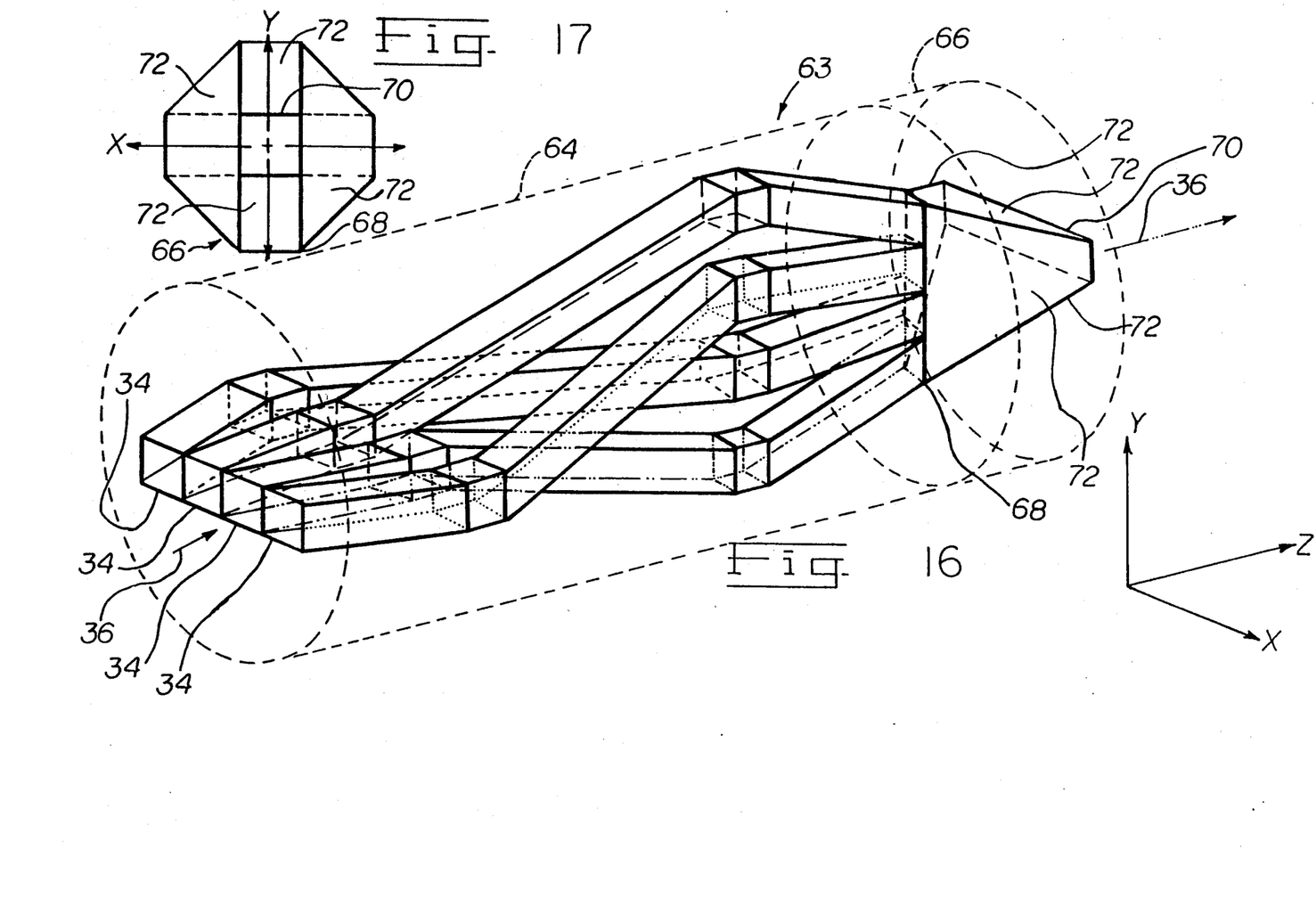
FIG. 16 depicts an alternate embodiment of an apparatus of the present invention, with the conduits and cavities defined therein for fluid flow being shown in solid outline for clarity of viewing.
FIG. 17 is a front view of the second sub-element of the apparatus of FIG. 16.

An alternate embodiment of an apparatus for producing multilayered streams from a first composite stream is shown in FIGS. 16 and 17 and designated by the numeral 63. The embodiment 63 is comprised in part of a first sub-element 64 which divides a first composite stream into branch streams, repositions the branch streams, and independently adjusts the flow rates of the various branch streams as they are recombined and enter a second sub-element 66. The second sub-element 66 thereafter symmetrically expands and contracts the recombined branch streams or second composite stream, in proceeding from an inlet opening 68 aligned with the y-axis to an outlet opening 70 aligned with the x-axis.

Second sub-element 66 shown in FIGS. 16 and 17 defines a tetrahedral cavity through which the second composite stream flows and is symmetrically expanded and contracted, the tetrahedral cavity being formed for this purpose by the intersection of sides 72 in the form of four truncated isosceles (or equilateral, depending on the dimensions of the inlet opening 68 and outlet opening 70 in the y- and x-directions, respectively) triangles.

The layer thickness gradient or layer thickness distribution established in the apparatus 26 by the independent, controllable contraction of the branch streams and thus by the independent restriction of the flow rates of the branch streams in the third sub-element, can be established also in the apparatus 63 by the same means. Thus, instead of using replaceable vanes 58 (FIG. 13) or rotatable vanes 60 (FIG. 14) in a third sub-element 32, vanes 58 or preferably vanes 60 are employed at the conclusion of the first sub-element 64 of the apparatus 63 just prior to the branch streams'entry into the cavity defined by the sides 72.

The second composite stream emerging from an apparatus 26 or 63 may itself become the feed stream (i. e., the first composite stream) to a second ISG of the present invention and so on; and while the focus of the present disclosure has been on the making of multilayer films wherein a layer gradient is desirable, the second composite stream from an apparatus 26 or 63 may be formed into such a film or may instead be formed into multilayer sheet or a multilayer, molded article such as by a thermoforming process.

A feature of common significance in the embodiments of FIGS. 2-15 and of FIGS. 16 and 17 is the symmetrical expansion and contraction of the divided and stacked branch streams in the apparatus 26, or of the second composite stream comprised of the recombined branch streams in the apparatus 63. A symmetrical expansion in the x- or transverse dimension of the branch streams or of the second composite stream from along the y-axis, rather than unevenly from a peripheral portion of the given apparatus, prevents the bulk of the materials in a given branch stream or in the second composite stream from being funneled or channeled along the near wall of the apparatus relative to such peripheral portion. Distortions in individual layer thicknesses (in the plane of the layers or along the x-axis) because of this channeling effect (due to the flow path being shorter along the nearer wall as opposed to the far wall) are in this manner discouraged from occurring.

In the same manner, the symmetrical (along the x-axis) reduction of the thickness of the layers in a given branch stream or in the second composite stream is designed to avoid causing distortions in the thickness of such layers along the x-axis or in the transverse direction, as well as to avoid creating flows in the y-direction which might tend to disrupt the thinly-layered character of a branch stream or the second composite stream.

One of the difficulties in achieving a prescribed layer thickness gradient or other distribution of layer thicknesses with known feedblock-ISG combinations, as mentioned earlier, is the tendency of existing ISG's to distort the layers of an incoming first composite stream. This difficulty is addressed in part as described in the preceding paragraphs, by expanding and contracting the branch streams from a first composite stream or the second composite stream in a symmetrical fashion. Preferably the distorting tendencies of previous ISG's are avoided also by manipulating the first composite stream, the branch streams, and/or the second composite stream gradually.

Obviously, limitations of space or concerns about thermal degradation of materials in a stream may limit the length over which these manipulations may be carried out to achieve a second stream having a desired number of layers of the one or more materials. In such cases, modifications to the illustrated apparatus may be appropriate, for example, dividing the first composite stream into more than four branch streams, shortening one or more of the sub-elements, changing the feedblock to initially produce a first composite stream having more layers of the materials of interest, etc. The person of ordinary skill in the art is, however, well-equipped to select between and to make these modifications for particular applications of the invention.

While preferred embodiments of the method and apparatus of the present invention have been described, it will be appreciated that numerous changes in these embodiments can be made which are nevertheless within the scope and spirit of the present invention, as more particularly defined hereafter.

What is claimed is:

1. A method for making multilayer films having a prescribed distribution of the thicknesses of the layers of one or more materials from one major surface of the film to an opposing surface, comprising the steps of:
dividing a first composite stream comprised of discrete overlapping layers of the one or more materials, of which at least a pair of such layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers, into a plurality of branch streams along the x-axis, such that the pair of discrete overlapping layers and the generally planar layer interface defined therebetween are distributed among two or more of the branch streams;

repositioning at least the two or more branch streams along both of the x- and y-axes as the branch streams flow along the x-axis;

individually symmetrically expanding a transverse dimension of at least the two or more branch streams along the x-axis;

individually symmetrically contracting the thickness of at least the two or more branch streams along the y-axis;

independently adjusting the flow rates of at least the two or more branch streams to which the pair of discrete overlapping layers and the generally planar layer interface therebetween were distributed; and recombining the plurality of branch streams in overlapping relationship to form a second composite stream having a greater number of discrete overlapping layers of the one or more materials than the first composite stream distributed generally in the prescribed distribution.

2. A method as defined in claim 1, wherein the flow rates of the two or more branch streams are independently adjusted by independently controllably contracting the thicknesses of the two or more branch streams along the y-axis.

3. A method as defined in claim 1, wherein the first composite stream is divided into a plurality of branch streams of substantially identical rectangular or square cross-section.

4. A method as defined in claim 1, wherein the step of repositioning the branch streams is accomplished without significantly altering their cross-sections.

5. A method as defined in claim 1, wherein the step of repositioning the branch streams includes divergently displacing the branch streams along the y-axis and convergently displacing the branch streams along the x-axis.

6. A method as defined in claim 1, wherein the first composite stream is divided into an even number of branch streams.

7. A method as defined in claim 1, wherein at least some of the discrete, overlapping layers of the one or more materials in the first composite stream are of a generally planar, substantially continuous nature and span the first composite stream along the x-axis.

8. A method as defined in claim 7, wherein the branch streams are recombined whereby the second composite stream comprises a greater number of discrete, generally planar and substantially continuous layers of the one or more materials than the first composite stream which are distributed in the second composite stream in the prescribed distribution.

9. A method as defined in claim 1, wherein the first composite stream is originally possessed of layers of the one or more materials in the prescribed layer thickness distribution.

10. A method for making multilayer films having a prescribed distribution of the thicknesses of the layers of one or more materials from one major surface of the film to an opposing surface, comprising the steps of:
dividing a first composite stream comprised of
discrete overlapping layers of the one or more materials, of which at least a pair of such layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers, into a plurality of branch streams along the x-axis, such that the pair of discrete overlapping layers and the generally planar layer interface defined therebetween are distributed among two or more of the branch streams;

repositioning at least the two or more branch streams along both of the x- and y-axes as the branch streams flow along the z-axis;

independently adjusting the flow rates of at least the two or more branches streams to which the pair of discrete overlapping layers and the generally planar layer interface therebetween were distributed;

recombining the plurality of branch streams in overlapping relationship to form a second composite stream having a greater number of discrete overlapping layers of the one or more materials than the first composite stream in the prescribed distribution;

symmetrically expanding a transverse dimension of the second composite stream along the x-axis; and symmetrically contracting the thickness of the second composite stream along the y-axis.

11. A method as defined in claim 10, wherein the flow rates of the two or more branch streams are independently adjusted by independently controllably contracting the thicknesses of the two or more branch streams along the y-axis.

12. A method as defined in claim 10, wherein the first composite stream is divided into a plurality of branch streams of substantially identical rectangular or square cross-section.

13. A method as defined in claim 10, wherein the step of repositioning the branch streams is accomplished without significantly altering their cross-section.

14. A method as defined in claim 13, wherein the step of repositioning the branch streams includes divergently displacing the branch streams along the y-axis and convergently displacing the branch streams along the x-axis.

15. A method as defined in claim 10, wherein the first composite stream is divided into an even number of branch streams.

16. A method as defined in claim 10, wherein least some of the discrete, overlapping layers of the one or more materials in the first composite stream are of a generally planar, substantially continuous nature and span the first composite stream along the x-axis.

17. A method as defined in claim 16, wherein the second composite stream after being expanded and contracted comprises a grater number of discrete, generally planar and substantially continuous layers of the one or more materials than the first composite stream, distributed generally in the prescribed distribution.

18. A method as defined in claim 10, wherein the first composite stream is originally possessed of layers of the one or more materials in the prescribed layer thickness distribution.

19. A method of making a multilayered plastic article, comprising the steps of:
   forming a second composite stream according to the method of claim 1; and
   molding the second composite stream into a desired configuration.

20. A method of making a multilayered plastic article, comprising the steps of:
   forming, expanding and contracting a second composite stream according to the method of claim 10; and
   molding the second composite stream into a desired configuration.

21. An apparatus for generating interfacial surfaces within a first composite stream comprised of discrete overlapping layers of the one or more materials, of which at least a pair of such layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendicularly away from the planar layer interface in the thickness direction of the pair of discrete overlapping layers, said apparatus comprising:
   dividing means for dividing the first composite stream into a plurality of branch streams along the x-axis, such that the pair of discrete overlapping layers and the generally planar layer interface defined therebetween are distributed among two or more of the branch streams;
   a plurality of first conduits for repositioning the branch streams along both the x-axis and the y-axis;
   a plurality of second conduits in fluid communication with the first conduits, with each second conduit having a progressively greater transverse dimension along the x-axis from an inlet opening to an outlet port thereof, the inlet opening being positioned centrally in the apparatus;
   a plurality of third conduits in fluid communication with the second conduits, with each third conduit having a dimension in the y-direction which becomes progressively lesser from an inlet opening to an outlet port thereof;
   means for individually adjusting the dimension in the y-direction of each of the third conduits at a downstream end thereof; and
   means for recombining the branch streams from the third conduits to form a second composite stream which comprises a greater number of discrete overlapping layers of the one or more materials than the first composite stream in the prescribed distribution.

22. An apparatus as defined in claim 21, wherein the means for individually adjusting the dimension in the y-direction of each of third conduits at a downstream end thereof comprises a plurality of replaceable or rotatable vanes, with each vane forming a portion of a respective third conduit adjacent the downstream end of the conduit.

23. An apparatus for generating interfacial surfaces within a first composite stream comprised of discrete overlapping layers of the one or more materials, of which at least a pair of such layers define a generally planar layer interface therebetween which lies generally in an x-z plane of an x-y-z coordinate system, wherein the z-axis is taken as extending in the general direction of flow of the first composite stream, the x-axis extends transversely of the first composite stream and defines a transverse dimension of the layer interface, and the y-axis extends generally perpendiculary away from the planar layer interface in the thickness direction of the pair of discrete overlapping layers, said apparatus comprising:
   dividing means for dividing the first composite stream into a plurality of branch streams along the x-axis, such that the pair of discrete overlapping layers and the generally planar layer interface defined therebetween are distributed among two or more of the branch streams;
   a plurality of first conduits for repositioning the branch streams along both the x-axis and the y-axis;
   means for individually adjusting the dimension in the y-direction of each of the first conduits at a downstream end thereof; and
   a conduit wherein the branch streams are recombined and symmetrically expanded and contracted, said conduit defining a tetrahedral cavity through which the recombined branch streams flow, the cavity being formed by the intersection of the sides of the conduit in the form of four isosceles triangles or equilateral triangles.

24. An apparatus as defined in claim 23, wherein the means for individually adjusting the dimension in the y-direction of each of the first conduits at a downstream end thereof comprises a plurality of replaceable or rotatable vanes, with each vane forming a portion of a respective first conduit adjacent the downstream end of the conduit.

* * * * *

UNITED STATES PATENT AND TRADEMARK OFFICE
CERTIFICATE OF CORRECTION

PATENT NO. : 5,094,788
DATED : Mar. 10, 1992
INVENTOR(S) : Schrenk et al.

It is certified that error appears in the above-identified patent and that said Letters Patent is hereby corrected as shown below:

Claim 1, column 9, line 20, the word "x-axis" should be --z-axis--.

Claim 10, column 10, line 33, the word "branches" should be --branch--.

Claim 13, column 10, line 57, the word "cross-section" should be --cross-sections--.

Claim 17, column 11, line 5, the word "grater" should be --greater--.

Claim 22, column 12, line 14, the words "of each of third" should be --of each of the third--.

Signed and Sealed this

Twenty-ninth Day of June, 1993

Attest:

MICHAEL K. KIRK

*Attesting Officer*  *Acting Commissioner of Patents and Trademarks*